United States Patent [19]

Reuter et al.

[11] 4,413,116

[45] Nov. 1, 1983

[54] PROCESS FOR THE PREPARATION OF POLYESTERS OR ALKYD RESINS, RESINS WHICH MAY BE OBTAINED ACCORDING TO THIS PROCESS AND THE USE THEREOF AS LACQUER BINDERS

[75] Inventors: Knud Reuter; Rolf Dhein; Lothar Fleiter, all of Krefeld, Fed. Rep. of Germany

[73] Assignee: Bayer Aktiengesellschaft, Leverkusen, Fed. Rep. of Germany

[21] Appl. No.: 366,584

[22] Filed: Apr. 8, 1982

[30] Foreign Application Priority Data

Apr. 14, 1981 [DE] Fed. Rep. of Germany ....... 3115072

[51] Int. Cl.$^3$ ..................... C08G 63/12; C08G 63/48; C09D 3/64
[52] U.S. Cl. .................................. 528/307; 525/437; 525/443; 260/404.8; 528/272; 528/295.5; 528/302

[58] Field of Search ................. 260/404.8; 528/295.5, 528/272, 307, 302; 106/252, 264

[56] References Cited

U.S. PATENT DOCUMENTS

| 3,673,139 | 6/1972 | Hrach | 528/272 |
|---|---|---|---|
| 4,042,547 | 8/1977 | Kaiser et al. | 260/404.8 |
| 4,324,880 | 4/1982 | Dhein et al. | 528/302 |
| 4,346,044 | 8/1982 | Dhein et al. | 260/404.8 |

FOREIGN PATENT DOCUMENTS 1095953 12/1967 United Kingdom ............... 528/272

Primary Examiner—Ronald W. Griffin
Attorney, Agent, or Firm—Connolly and Hutz

[57] ABSTRACT

Penta- or hexahydric sugar alcohols are outstandingly suitable as a polyol component for the preparation of polyesters or alkyd resins. Secondary reactions resulting in darkening are substantially avoided if as small a quantity as possible of aromatic polycarboxylic acid components is used.

8 Claims, No Drawings

PROCESS FOR THE PREPARATION OF POLYESTERS OR ALKYD RESINS, RESINS WHICH MAY BE OBTAINED ACCORDING TO THIS PROCESS AND THE USE THEREOF AS LACQUER BINDERS

This invention relates to a process for the preparation of polyesters or alkyd resins (=polyesters modified with fatty acids) from penta- or hexahydric alcohols and cycloaliphatic polycarboxylic acids (or the derivatives thereof), polyesters or alkyd resins obtainable by this process, and the use thereof as lacquer binders, in particular for air-drying lacquers.

The use of sugar alcohols, for example, sorbitol, mannitol and xylitol, for the preparation of polyesters or alkyd resins is known; see R. M. Goepp et al., Ind. Eng. Chem. 30, (33), 1222-1227 (1938), E. Schwenk et al., Defazet 10 (3), 79-83 (1956), K. Hájek, Farbe und Lack 83 (9), 798-804 (1977), S. Creselius, Off. Digest 25, 175-178 (1953) and J. P. Burns, Paint Varn. Prod. 48, 54-56, 157 (1958).

Compared to conventional polyol components, such as glycerine, trimethylolpropane and pentaerythritol, the polyhydric linear aliphatic alcohols have proved to be extremely sensitive to elevated temperatures and acidic media. The secondary reactions which occur extensively produce an undesirable darkening of the resins. According to the above-mentioned Defazet article, the use of only 10% of sorbitol entails a fivefold increase in the iodine colour number of an alkyd resin, compared with a sorbitol-free alkyd resin.

The sensitivity of sugar alcohols has meant that in the past, attempts were made to suppress as substantially as possible the secondary reactions by specific and complex processes.

The disadvantages described have hitherto opposed a widespread commercial use of penta- and hexahydric sugar alcohols, although they are easily accessible and are relatively cheap. Since a more widespread use of petroleum-independent raw materials appears to be desirable, the object of the present invention was to prepare polyesters or alkyd resins from penta- and hexahydric sugar alcohols, without the abovementioned disadvantages occurring.

Surprisingly, it has been found that penta- and hexahydric sugar alcohols may be used in a relatively simple manner as a polyol component for the preparation of polyesters or alkyd resins, if as large quantities of cycloaliphatic polycarboxylic acids as possible (or the derivatives thereof) are used as the acid component and if the use of aromatic polycarboxylic acids (or the derivatives thereof) is substantially, and preferably completely, relinquished.

The present invention provides a process for the preparation of polyesters, which are optionally modified with fatty acid, from di- to hexahydric alcohols, polycarboxylic acids (or the derivatives thereof which are capable of esterification), optionally monocarboxylic acids and/or monohydric alcohols, characterised in that (a) at least 10% by weight, preferably at least 30% by weight, in particular above 60% by weight, of all the alcohols used consist of penta- or hexahydric sugar alcohols, and (b) from 50 to 100% by weight, preferably from 80 to 100% by weight, and in particular from 98 to 100% by weight, of all the polycarboxylic acid components used, consist of cycloaliphatic polycarboxylic acids or the derivatives thereof which are capable of esterification, provided that the polycarboxylic acid components which are used do not contain more than 50% by weight, preferably not more than 30% by weight, and in particular not more than 10% by weight, of aromatic polycarboxylic acids or the derivatives thereof which are capable of esterification. "Polycarboxylic acids" are in particular di-, tri- and tetra-basic carboxylic acids.

The present invention also provides polyesters or alkyd resins which may be obtained according to this process. Furthermore, the present invention relates to the use of these polyesters and alkyd resins as lacquer binders, in particular for air-drying lacquers.

Lacquers which dry advantageously and have a good hardness may surprisingly be produced from the resins prepared according to the present invention, in spite of the substantial or complete exclusion of phthalic acid or isophthalic acid.

The penta- or hexahydric alcohols to be used according to the present invention preferably correspond to the following formula:

$$HOCH_2-(CHOH)_n-CH_2OH \qquad (I)$$

wherein
n represents 3 or 4.

The alcohols may be produced by reduction, for example, by catalytic hydrogenation of the pentoses and hexoses. Alcohols (I) which are preferably to be used according to the present invention are adonitol, arabitol, xylitol, dulcitol, iditol, mannitol and sorbitol. Xylitol is the particularly preferred pentitol and mannitol and sorbitol are particularly preferred hexitols, sorbitol being the most preferred alcohol (I) above all.

In the following, the term "polyesters" is understood to mean fatty acid-free and oil-free polyesters and the term "alkyd resins" is understood to mean fatty acid-modified and oil-modified polyesters.

The terms "alkyd resins" and "polyesters" are understood to mean polycondensates which are prepared by polycondensation according to known processes from alcohols and carboxylic acids, of the type defined, for example, in Römpp's Chemielexikon Vol. 1, p. 202, Frankh'sche Verlagsbuchhandlung, Stuttgart, 1966 or described by D. H. Solomon, in "The Chemistry of Organic Filmformers", p. 75-101, John Wiley & Sons Inc., New York, 1967.

Suitable alcohols to be used for the synthesis of the polyesters and alkyd resins, in addition to the alcohols (I), are aliphatic, cycloaliphatic and/or araliphatic alcohols having from 1 to 6, preferably from 1 to 4 OH-groups bound to non-aromatic carbon atoms and from 1 to 24 carbon atoms per molecule, for example, glycols such as ethylene glycol, propylene glycol, butanediols, hexanediols; ether alcohols such as di- and tri-ethylene glycols; oxethylated bisphenols; perhydrogenated bisphenols; also trimethylolethane, trimethylolpropane, glycerine, pentaerythritol, dipentaerythritol; and monohydric, chain-terminating alcohols such as propanol, butanol, cyclohexanol and benzyl alcohol.

Cycloaliphatic polycarboxylic acids to be used for the synthesis of the polyesters and alkyd resins are generally such polycarboxylic acids which contain at least one cycloaliphatic saturated or unsaturated ring, to which the carboxyl groups are directly bonded. Examples of polycarboxylic acid derivatives which are capable of esterification are the anhydrides and esters thereof.

For example, 1,2,3,4-tetrahydro-naphthalene-2,3-dicarboxylic acid (anhydride) is included among the cycloaliphatic dicarboxylic acids or (anhydrides) to be used according to the present invention, but the isomeric 1,2,3,4-tetrahydronaphthalene-6,7-dicarboxylic acid or the anhydride thereof is not included, because in this case, both carboxyl groups are bound to the aromatic ring.

Preferred cycloaliphatic dicarboxylic acids or the derivatives thereof capable of esterification are those having from 8 to 12 carbon atoms per molecule, for example, 1,2,3,6-tetrahydrophthalic acid (anhydride), 3-methyl-1,2,3,6-tetrahydrophthalic acid(anhydride), 4-methyl-1,2,3,6-tetrahydrophthalic acid(anhydride), hexahydrophthalic acid (anhydride), 3-methylhexahydrophthalic acid (anhydride), 4-methyl-hexahydrophthalic acid(anhydride), endomethylene-terehydrophthalic acid(anhydride)=bicyclo-2,2,1-hept-2-ene-5,6-dicarboxylic acid(anhydride).

Cycloaliphatic dicarboxylic acid components which are particularly preferred are hexahydrophthalic acid (anhydride) and in particular tetrahydrophthalic acid (anhydride).

The quantity of aromatic polycarboxylic acid components which may be used without disadvantage depends on the quantity of the sugar alcohols (a) used: the greater the amount of sugar alcohols, the smaller the quantity of aromatic polycarboxylic acid components.

Acid components which are preferred for the synthesis of the polyesters and alkyd resins in addition to the cycloaliphatic polycarboxylic acids or the derivatives thereof are aliphatic and aromatic multibasic carboxylic acids, preferably di-, tri- and tetracarboxylic acids, having from 4 to 12 carbon atoms per molecule or the derivatives thereof capable of esterification (for example, anhydrides or esters), for example phthalic acid anhydride, isophthalic acid, terephthalic acid, trimellitic acid anhydride, pyromellitic acid anhydride, maleic acid anhydride, fumaric acid, glutaric acid (anhydride), adipic acid and succinic acid anhydride, sebacic acid, also halogenated acids, such as chlorophthalic acids, for example, 3,4,5,6-tetrachlorophthalic acid (anhydride).

Monocarboxylic acids which are preferred for the preparation of the polyesters and alkyd resins are aliphatic, cycloaliphatic, saturated and unsaturated and/or aromatic monocarboxylic acids having from 6 to 24 carbon atoms per molecule, such as benzoic acid, butylbenzoic acid, toluic acid, hexahydrobenzoic acid, abietic acid, lactic acid and fatty acids and esters thereof such as linseed oil, soybean oil, wood oil sunflower oil, safflower oil, castor oil, dehydrated castor oil, cottonseed oil, arachis oil, oiticica oil, fatty acid of tall oil, of linseed oil, soybean oil, wood oil, sunflower oil, oiticica oil, safflower oil and dehydrated castor oil and products obtained from natural, unsaturated oils or fatty acids by conjugation or isomerisation; suitable saturated fatty acids are, for example, coconut oil fatty acid and α-ethylhexanoic acid and isotridecanoic acid.

The acid numbers of the polyesters and alkyd resins prepared according to the present invention preferably range from 3 to 60, for example, from 3 to 20 (oil-free or air-drying), from 15 to 35 (dehydrated castor oil type), or from 30 to 60 (water-dilutable, before neutralisation).

The molecular weight of the polyesters and alkyd resins determined as a number average is from 2,000 to 10,000 (determined by vapour pressure osmometry in dioxane and acetone for molecular weights up to 5,000, and where there are differing values, the lower value is considered as being correct; determined by membrane osmometry in acetone for molecular weights of above 5,000).

The quantity of fatty acids or oils used may be freely selected within the scope which is established by the required use. Thus, the resins to be prepared according to the present invention may be oil-free, short, medium or long-oil types.

The fatty acids are preferably incorporated via the esterification of the free acids, but it is also possible to obtain alkyd resins according to the present invention via the natural oils by transesterification and subsequent polyesterification.

The polyesters and alkyd resins may be prepared in a known manner by condensation according to conventional processes. The raw material mixtures are generally allowed to react at temperatures of from 140° to 260° C. under an inert gas atmosphere, for example, under nitrogen, with the release of water until the required acid number is reached.

Suitable polyesters and alkyd resins are, for example, also the polyester poly semi-esters which may be prepared by a two-stage reaction from alkyd resins or polyesters containing hydroxyl groups, and acid anhydrides (German Offenlegungsschrift No. 1,519,146), tetrahydrophthalic acid poly semi-esters being particularly preferred.

The alkyd resins are preferably used as a binder for air-drying lacquers and the oil-free polyesters are preferably used as a binder for stoving lacquers. Aminoplast resins are recommended as a cross-linking component for use as a binder for stoving lacquers.

Melamine-formaldehyde or urea-formaldehyde condensation products are included, for example, as aminoplast resins. Melamine resins are all conventional non-etherified melamine-formaldehyde condensates or such condensates etherified with saturated monoalcohols having from 1 to 4 carbon atoms, as described, for example, in French Patent No. 943,411 or by D. H. Solomon, in "The Chemistry of Organic Filmformers", 235–240, John Wiley & Sons, Inc., New York. 1967. However, the melamine resins may also be partly or completely replaced by other cross-linking aminoplasts, as described, for example, in "Methoden der Organischen Chemie" (Houben-Weyl), Vol. 14/2, part 2, 4th edition, Georg Thieme Verlag, Stuttgart, 1963, 319 ff.

The polyesters and alkyd resins prepared according to the present invention, preferably dissolved in organic solvents, for example, in xylene or white spirit, may be worked up to form lacquers. However, they may also be used as a binder for aqueous lacquers after neutralisation of the free carboxyl groups.

The parts specified in the following Examples are parts by weight; percentages are based on weight.

EXAMPLE 1

1213 parts of sorbitol, 1420 parts of soybean oil fatty acid, 220 parts of benzoic acid and 928 parts of tetrahydrophthalic acid anhydride were heated together in a vessel provided with a stirrer and a distilling bridge for 1 hour at 140° C. and then for 8 hours at 210° C. while nitrogen was passed through. After a further 11 hours, the viscosity corresponded to an outflow time of 52 seconds (DIN 53 211, 50% in xylene) with an acid number of 12. After cooling to 140° C., the viscosity corresponded to an outflow time of 54 seconds and the acid number was 11. A 65% production form in xylene was produced from the resulting alkyd resin.

EXAMPLE 2

1213 parts of sorbitol, 1420 parts of soybean oil fatty acid, 220 parts of benzoic acid and 945 parts of hexahydrophthalic acid anhydride were reacted according to the process described in Example 1 and were converted into an alkyd resin having the following characteristics: viscosity corresponding to an outflow time of 47 seconds (50% in xylene), acid number 9. A 65% production form in xylene was produced from the alkyd resin.

EXAMPLE 3

1213 parts of sorbitol, 1924 parts of soybean oil fatty acid and 945 parts of hexahydrophthalic acid anhydride were reacted according to the process described in Example 1 and converted into an alkyd resin having the following characteristics: viscosity corresponding to an outflow time of 50 seconds (50% in xylene), acid number 4.5. A 65% production form in xylene was produced from the alkyd resin.

EXAMPLE 4

1213 parts of sorbitol, 1932 parts of soybean oil fatty acid and 928 parts of tetrahydrophthalic acid anhydride were converted according to the process described in Example 1 into an alkyd resin having the following characteristics: viscosity corresponding to an outflow time of 54 seconds (50% in xylene), acid number 6. A 65% production form in xylene was produced from the alkyd resin.

EXAMPLE 5

1213 parts of mannitol, 1420 parts of soybean oil fatty acid, 220 parts of benzoic acid and 928 parts of tetrahydrophthalic acid anhydride were converted according to the process described in Example 1 into an alkyd resin having the following characteristics: viscosity corresponding to an outflow time of 47 seconds (50% xylene), acid number 7.5. A 65% production form in xylene was produced from the alkyd resin.

EXAMPLE 6

619 parts of soybean oil fatty acid, 583 parts of sorbitol, 429 parts of trimethylolpropane, 865 parts of tetrahydrophthalic acid anhydride and 170 parts of benzoic acid were reacted according to the process analogously to Example 1, but to a final temperature of 220° C., and were converted into an alkyd resin having the following characteristics: viscosity corresponding to an outflow time of 128 seconds (50% in xylene), acid number 19. A 60% production form in xylene was produced from the alkyd resin.

EXAMPLE 7

448 parts of xylitol, 568 parts of soybean oil fatty acid, 88 parts of benzoic acid and 371 parts of tetrahydrophthalic acid anhydride were converted according to the process described in Example 1 into an alkyd resin having the following characteristics: viscosity corresponding to an outflow time of 22 seconds (50% in xylene), acid number 5.5. A 65% production form in xylene was produced from the alkyd resin.

EXAMPLE 8

1070 parts of sorbitol, 758 parts of tetrahydrophthalic acid anhydride and 2248 parts of soybean oil fatty acid were heated together for 1 hour at 120° C. and then for 7 hours at 260° C. while nitrogen was passed through. After a further 7 hours, the viscosity corresponded to an outflow time of 87 seconds (60% in white spirit). After cooling to 240° C. and for a further 5 hours at this temperature, the viscosity corresponded to an outflow time of 140 seconds (60% in white spirit). After cooling, the viscosity corresponded to an outflow time of 178 seconds (60% in white spirit) and the acid number was 17.

Table 1 shows the outstanding inherent colouring of the resins according to the present invention.

TABLE 1

| Example | | | | | | | | |
|---|---|---|---|---|---|---|---|---|
| 1 | 2 | 3 | 4 | 5 | 6 | 7 | 8 | |
| 10 | 15 | 10 | 10 | 5 | 15 | 6 | 20 | Iodine colour number, 50% in xylene (DIN 6162) |

Table 2 shows the drying of clear lacquers based on Examples according to the present invention (55 μm layer thickness of dry film):

TABLE 2

| Example | Drying to non-tackiness (h) |
|---|---|
| 1 | 3.5 |
| 2 | 4.5 |
| 3 | 4.5 |
| 4 | 4.5 |
| 5 | 5.5 |
| 6 | 1.0 |
| 7 | 4.5 |
| 8 | about 8 |

The pendulum hardnesses (DIN 53 157) of a few examples of clear lacquers are stated in Table 3 which verify the good characteristics of the binders according to the present invention in this respect as well (55 μm layer thickness of dry film on glass):

TABLE 3

| Example | Pendulum hardness after 72 h drying time (sec) |
|---|---|
| 1 | 21 |
| 2 | 19 |
| 3 | 17 |
| 4 | 17 |
| 6 | 18 |
| 7 | 19 |

EXAMPLE 9

1014 parts of sorbitol, 1014 parts of propylene glycol, 858 parts of adipic acid and 1409 parts of tetrahydrophthalic acid anhydride are heated together for 1 hour at 120° C. and then for 14 hours at 220° C. under a nitrogen atmosphere. After a further 30 minutes, the viscosity corresponded to an outflow time of 48 seconds (60% in dimethylformamide) and the acid number was 15. A sample of the oil-free polyester was dissolved 50% in xylene/dimethylformamide (weight ratio of 2:1). The iodine colour number of this sample was 7.

We claim:

1. A process for the preparation of polyesters, which are optionally modified with fatty acids, from di- to hexahydric alcohols, polycarboxylic acids (or the derivatives thereof capable of esterification), optionally monocarboxylic acids and/or monohydric alcohols, characterised in that (a) at least 10% by weight of all the alcohols used consist of penta— or hexahydric sugar alcohols, and
(b) from 50 to 100% by weight of all the polycarboxylic acid components used consist of cycloaliphatic polycarboxylic acids or the derivatives thereof capable of esterification, provided that the polycarboxylic acid components used do not contain more than 50% by weight of aromatic polycarboxylic acids or the derivatives thereof capable of esterification.

2. A process according to claim 1, characterised in that the di- to hexahydric alcohols consist to at least 30% by weight, based on all the alcohols used, of penta- or hexahydric sugar alcohols.

3. A process according to claim 1, characterised in that the di- to hexahydric alcohols consist of more than 60% by weight, based on all the alcohols used, of penta- or hexahydric sugar alcohols.

4. A process according to claim 1, characterised in that the polycarboxylic acids or the derivatives thereof consist of from 80 to 100% by weight, based on all the polycarboxylic acid components used, of cycloaliphatic polycarboxylic acids or the derivatives thereof capable of esterification.

5. A process according to claim 1, characterised in that the polycarboxylic acids or the derivatives thereof consist of from 98 to 100% by weight, based on all the polycarboxylic acid components used, of cycloaliphatic polycarboxylic acids or the derivatives thereof capable of esterification.

6. Polyesters and alkyd resins obtainable by processes in accordance with claim 1.

7. The use of the resins according to claim 6 as a lacquer binder.

8. The use according to claim 7 for air-drying lacquers.

* * * * *